Figure 1:
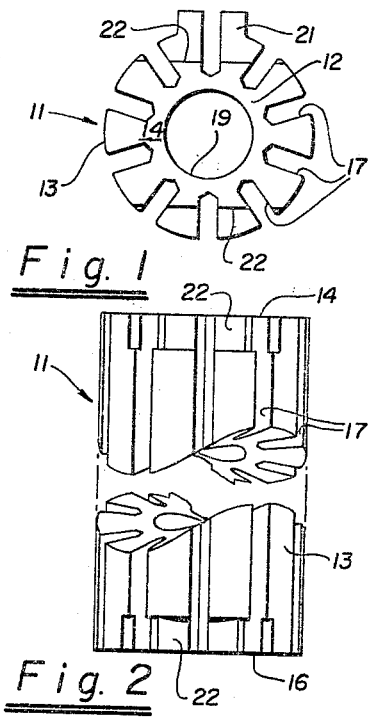

June 13, 1967  C. P. J. SUVERKROPP  3,325,772
PLUG AND HOLDER AND ASSEMBLY THEREOF
Filed Oct. 23, 1965  2 Sheets-Sheet 1

INVENTOR.
Claus P. J. Suverkropp
BY
*Flehr and Swain*
Attorneys

June 13, 1967  C. P. J. SUVERKROPP  3,325,772
PLUG AND HOLDER AND ASSEMBLY THEREOF
Filed Oct. 23, 1965  2 Sheets-Sheet 2

INVENTOR.
Claus P. J. Suverkropp
BY
Attorneys

United States Patent Office 3,325,772
Patented June 13, 1967

3,325,772
PLUG AND HOLDER AND ASSEMBLY THEREOF
Claus P. J. Sauerkropp, Sunnyvale, Calif., assignor to Signetics Corporation, Sunnyvale, Calif., a corporation of California
Filed Oct. 23, 1965, Ser. No. 503,513
6 Claims. (Cl. 339—193)

The present invention relates to a plug and holder and assembly thereof and more particularly to a plug and holder and assembly thereof adapted for use with the TO–5 electronic package.

In the packaging of a semi-conductor device such as a transistor and/or integrated circuit, a package known as the TO–5 has been used for a considerable length of time. In the use of this package, considerable difficulty has been encountered in testing the device's circuitry within the package because of the difficulty in inserting the leads of the TO–5 package into sockets or contactors. In addition, it has been found that often the leads of the package are deformed during insertion. Also, considerable time has been required for making each insertion. There is, therefore, a need for apparatus to facilitate the testing of devices in the TO–5 packages.

It is accordingly an object of this invention to provide a plug and holder and assembly thereof which can be utilized for testing and particularly to facilitate the testing of devices while in the electronic packages.

Another object of the invention is to provide a plug, a plug holder and assembly of the above character which is particularly adapted for use in the testing of the TO–5 packages with the devices mounted therein.

Another object of the invention is to provide a plug, holder and an assembly of the above character which can be readily and inexpensively fabricated.

Another object of the invention is to provide a plug of the above character upon which the electronic package can be placed and which will remain with the electronic package until the electronic package is ready for use.

Another object of the invention is to provide a plug of the above character which is relatively inexpensive so that it can be made as a throw-away item.

Another object of the invention is to provide a holder for the plug so as to provide an electrical contact with the leads of a package carried by the plug.

Another object of the invention is to provide a holder of the above character which ensures that positive contact is made with all of the leads of the package.

Another object of the invention is to provide a holder of the above character in which the plug with the package thereon can be readily inserted and removed.

Another object of the invention is to provide a holder of the above character which is particularly adapted for testing of the electronic device and the package.

Another object of the invention is to provide an assembly of the holder with the plug in mind therein which can be utilized for testing the devices within the package mounted upon the plug.

Additional objects and features of the invention will appear from the following description in which the preferred embodiments are set forth in detail in conjunction with the accompanying drawings.

Figure 5:
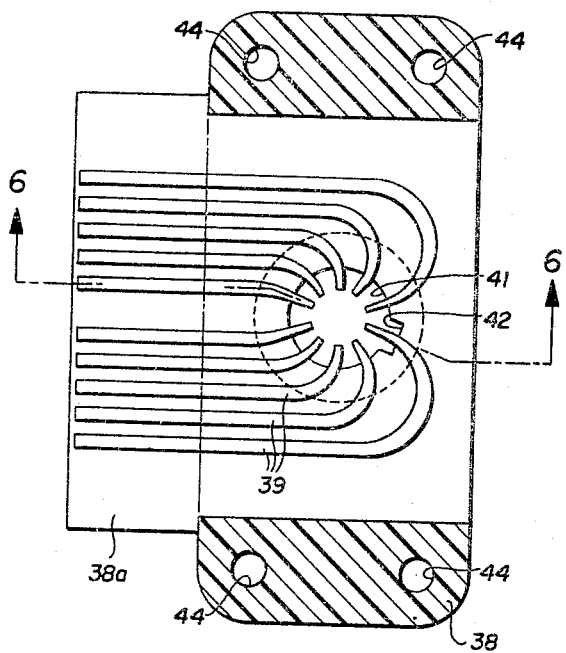
Figure 3:
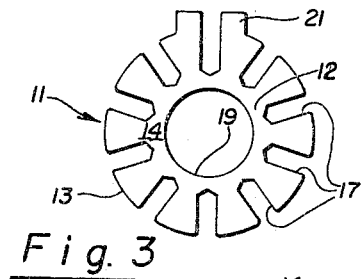
Figure 6:
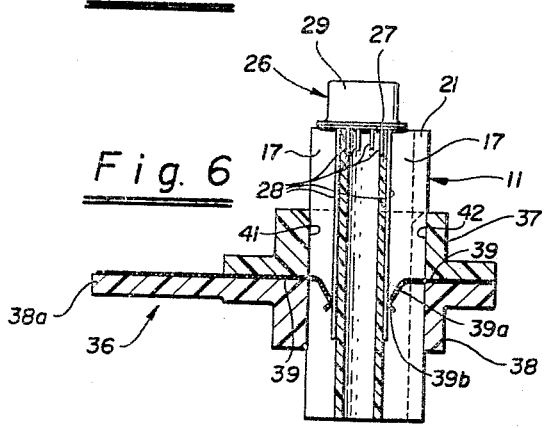
Figure 4:
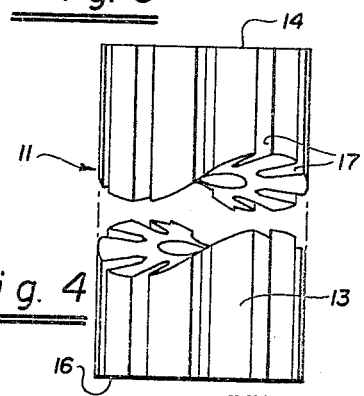
Figure 7:
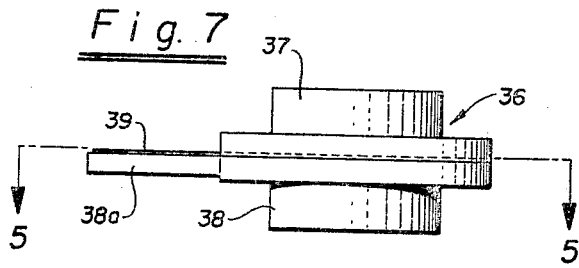
Figure 8:
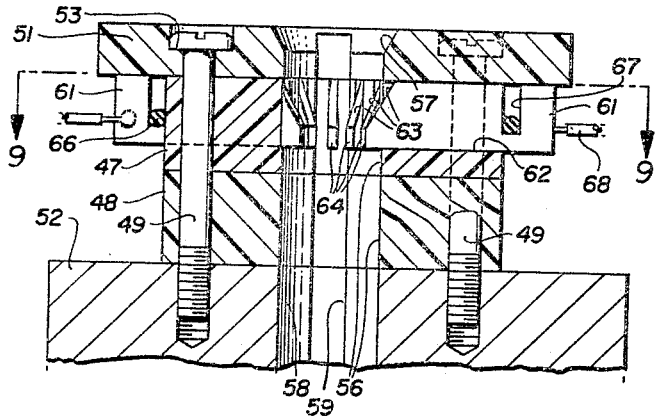
Figure 9:
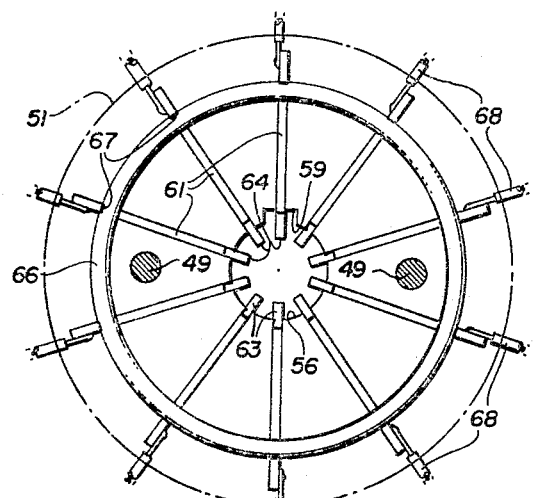
Figure 10:
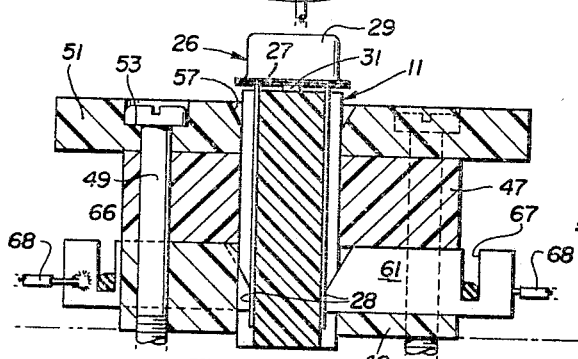
Figure 11:
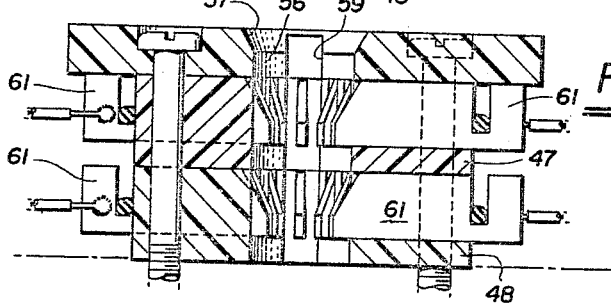

Referring to the drawings:
FIGURE 1 is a top plan view of a plug incorporating the present invention.
FIGURE 2 is a side elevational view of the plug shown in FIGURE 1.
FIGURE 3 is a top plan view of another embodiment of a plug incorporating the present invention.
FIGURE 4 is a side elevational view of the plug shown in FIGURE 3.
FIGURE 5 is a cross-sectional view taken along the line 5—5 of FIGURE 7 in cross-section showing a holder for a plug incorporating the present invention.
FIGURE 6 is a cross-section of view taken along line 6—6 of FIGURE 5.
FIGURE 7 is a side elevational view of the holder shown in FIGURES 5 and 6.
FIGURE 8 is a cross-sectional view showing another embodiment of a holder incorporating the present invention.
FIGURE 9 is a cross-sectional view taken along the line 9—9 of FIGURE 8.
FIGURES 10 and 11 are cross-sectional views similar to FIGURE 8 but showing additional embodiments of holders incorporating the present invention.

The plug 11 comprising the present invention is shown in FIGURES 1 and 2 and consists of a body 12 formed of a suitable insulating material such as plastic. The body can take any suitable form but preferably is in the form of a right cylinder having a cylindrical outer surface 13 and spaced parallel end surfaces 14 and 16. The body 12 is formed with a plurality of recesses or slots 17 which may be equally spaced opening through the cylindrical outer surface 13 and the end surfaces 14 and 16, and extending radially and longitudinally of the body 12. The number of slots or recesses 17 depends upon the number of leads or wires on the device which is to be received by the plug. Thus, as shown in the drawings, the plug can have ten such slots 17 spaced equally around the outer circumference of the body 12. The inner extremities of the grooves or slots 17 are also arranged in a circle and are adapted to particularly receive the leads from a ten-lead TO–5 header as hereinafter described. The plug 11 is also formed with a large central hole 19.

The body is also formed with a key 21 which extends outwardly from the cylindrical surface 13 and extends longitudinally of the body 12. It will be noted that one of the recesses or slots 17 is disposed in the key 21. The body 12 is also formed with parallel spaced cut-outs 22 on each end extending inwardly from the ends. The inner sides of the cut-outs 22 form chords as can be seen particularly from FIGURE 1. The cut-outs are used to facilitate the mounting of a plurality of the plugs in a carrying board or the like.

Another embodiment of the plug 11 is shown in FIGURES 3 and 4. This embodiment is identical to that shown in FIGURES 1 and 2 with the exception that the cut-outs 22 have been omitted.

The plugs in both embodiments are preferably formed of an insulating material which will withstand the temperature normally encountered in testing the TO–5 packages carried by the plugs. One suitable material is "Delrin" which is a material which will readily withstand 125° C. The plugs can be either extruded or molded of the plastic. However, it is generally desirable to mold the plugs in order to eliminate any burrs on the end faces which would be difficult to remove. Such burrs would interfere with inserting the leads into the recesses 17 in the plug. The length of the plug is chosen so that it is at least longer than any of leads which are to be received by the grooves or recesses.

The plugs shown in FIGURES 1 and 2, and 3 and 4 are of a type which are adapted to receive the TO–5 package 26 shown in FIGURE 6 which consists of a header 27. The header is formed with a metal rim in which there is mounted a suitable insulating structure such as glass which carries a plurality of downwardly depending leads 28 that extend upwardly through the insulating structure. The leads 28 are connected to a semiconductor device (not shown) such as an integrated circuit or a transistor by very fine gold wires (not shown) which are bonded to the leads and to appropriate connecting pads provided on the semiconductor device. The header 27 is formed in such a manner that all the leads are equally spaced and lie in a circle. The spacing of the recesses or slots 17 and the plugs 11 is such that they conform to the spacing of the leads 28 of the header 27. A can or cap 29 is mounted on the header 27 and is sealed on the rim of the header 27 in a conventional manner.

The header 27 is also provided with an additional stand-off insulating wafer 31 which is centrally disposed between the leads 28 below the header which serves as a spacer to prevent the header from making direct contact with the printed circuit leads when it is mounted on a printed circuit board. The header 27 is also provided with a small key (not shown) which is normally lined up with the key 21 of the plug so that the same leads will always be disposed in the same slots 17 of the plug.

The downwardly extending leads 28 of any TO-5 package can be inserted in the grooves 17 of a plug as shown in FIGURE 6 from either end of the plug so that the TO-5 package rests upon one end surface of the plug and is carried by the plug.

In order to make contact with the leads 28 in the recesses 17 of the plugs, the plugs are mounted in a holder or contactor 36. One embodiment of the holder or contactor 36 comprising the present invention is shown in FIGURES 5, 6 and 7. As shown therein, the holder or contactor 36 consists of upper and lower members 37 and 38. The members 37 and 38 are formed out of a suitable insulating material such as Lexan. It is desirable that the material used for the members 37 and 38 have good insulating properties and be usable at temperatures encountered in testing. A plurality of contact elements 39 is carried by the upper and lower members 37 and 38. These contact elements can be formed of any suitable conducting material in a suitable manner as, for example, the desired pattern of contact elements can be formed by etching, bending and heat treating a sheet of beryllium copper having a thickness of .010 of an inch. After the contact elements 39 have been formed, they can be secured to the members 37 and 38 by suitable means such as an epoxy adhesive whereby the contact elements 39 are bonded to the lower member 38 and also are bonded between the upper and lower members 37 and 38 to form a unitary assembly. As can be seen, the lower member 38 is provided with an extension 38a which carries the exposed outer ends of the contact elements 39. The inner ends of the contact elements 39 are spaced so that they terminate in an annulus as shown particularly in FIGURE 5 within holes 41 provided in the members 37 and 38. A keyway 42 is also provided to receive the key 21 provided on the plug.

As can be seen from FIGURE 6, the contact elements 39 are provided with inner downwardly depending portions 39a which are relatively narrow so that they can enter the recesses or slots 17 and engage the leads 28. The contact elements 39 are also provided with outwardly turned portions 39b so that the contact elements 39 will not clamp or grip the leads 28 within the holder or contactor 36. Because of this configuration of the contact elements, the plugs 11 with the packages 26 mounted thereon can be readily inserted and removed from the holder 36. The holder 36 is provided with a plurality of mounting holes 44 on opposite ends of the members 37 and 38 as can be seen from FIGURE 5.

Use of the plug 11 with the holder or contactor 36 may now be briefly described as follows. Let it be assumed that a TO-5 package containing the semiconductor element to be tested has been mounted upon the plug 11 so that the leads extend downwardly in the grooves or slots 17 as shown in FIGURE 5. Then let it be assumed that the plug with the TO-5 package mounted thereon is pushed downwardly into the holder or contactor 36 with the key 21 mating with the keyway 42. As soon as the plug is pushed downwardly into the contactor or holder 36, the contact elements 39 enter the slots 17 and then as the plug is pushed downwardly further, the inner portions 39a and 39b of the contact elements ride over the leads 28 and engage the leads as shown in FIGURE 6 of the drawings. As soon as this has been completed, the semiconductor device contained within the TO-5 package 26 can be tested by making contact with the contact elements 39 carried by the extension 38a in a suitable test apparatus. As can be seen, the holder or contact 36 itself is formed as a plug-in unit in which the contact elements 39 and the extension 38a serves as a male element adapted to be inserted into a female receptacle of an appropriate test apparatus.

As soon as the testing has been completed, the plug 11 with the package 26 mounted thereon can be removed by lifting it upwardly from the holder or contactor 36. Thereafter, the next plug with a package thereon can be placed in the holder or contactor 36. Thus, it can be seen that once the packages have been mounted upon the plugs, they can be readily tested merely by pushing them into a holder or contactor 36. It also should be appreciated that any number of testing operations and the like can be carried out without removing the TO-5 package from the plug. In other words, the plug can remain with the package through all testing and marking. In addition, if desired, the plug can be left on the package and the package shipped with the plug. In this way, the leads remain in perfect condition and are protected by being disposed within the recesses or slots 17 in the plug. When the TO-5 packages are mounted upon the plugs, the purchaser of the package can also utilize the plug in conjunction with a holder or contactor 36 to make any desired appropriate tests of the device before using the same.

A heavier duty holder or contactor 46 is shown in FIGURES 8 and 9 of the drawings. As shown therein, such a contactor consists of a cylindrical block 47 which is mounted upon a spacer block 48 and held in place by a pair of screws 49 which extend through a retaining ring 51 and through the blocks 47 and 48 into a support member 52. The heads of the screws 49 are seated within recesses 53 provided in the retaining ring 51 (see FIGURE 8). The retaining ring 51, the blocks 47 and 48 are provided with centrally disposed holes 56 which are in registration with each other. The upper portion of the retaining member 5 is provided with an outwardly and upwardly flared chamber 57 which adjoins the opening 56 provided in the retaining member 51. The support member 52 is provided with a hole 58 in registration with the holes 56 provided in the blocks 47 and 48. A keyway 59 is provided in the retaining ring 51, the blocks 47 and 48 and in the support member 52.

A plurality of contact elements or blades 61 are slidably mounted in slots or recesses 62 provided in the cylindrical block 47. The recesses 62 extend radially of the block and extend downwardly from the top surface of the block as shown in FIGURES 8 and 9. The retaining ring 51, the blocks 47 and 48 are formed of a suitable insulating material such as plastic, whereas the contact elements 61 are formed of a suitable conducting material such as copper. The contact elements 61 on the inner extremities are provided with downwardly and inwardly inclined surfaces 63 which adjoin substantially vertical contacting surfaces 64. The blades 61 are formed of such a width so they can readily enter the grooves or slots 17 provided in the plug 11 and the surfaces 64 are formed so they can readily engage the leads 28 of the package carried by a plug.

Means is provided for yieldably urging the blades or contact elements 61 into lead engaging positions and consists of an O-ring 66 formed of a suitable resilient material such as rubber disposed in open U-shaped slots 67 provided in the contact elements 61. The slots 67 are positioned in the contact elements 61 so that the contact elements are normally retained in a position such that the surfaces 64 are in a position which forms a circle which is smaller than the circle formed by the leads 28 of a package carried by a plug. Thus, when a plug with a package 26 mounted thereon is inserted in the hole 56, the contact elements 61 will be urged outwardly against the yieldable force created by the O-ring 66 and this helps to assure that good contact is made between the contact elements 61 and the leads 28 of the package carried by the plug. As soon as the plug is removed, the O-ring 66 will return the contact elements 61 to the positions shown in FIGURES 8 and 9. Leads 68 are secured to the contact elements 61 to make contact to the appropriate test equipment.

It can be seen that the construction of the holder or contactor 46 as shown in FIGURES 8 and 9 is such that many insertions and removals can be carried out without affecting the holder or contactor. This is particularly true of the relatively heavy contact elements 61 which can stand great amounts of use.

Two additional embodiments of the heavy duty contactor or holder of the type shown in FIGURE 9 are shown in FIGURES 10 and 11. As can be seen from FIGURE 10, the blade-like contact elements 61 are mounted in the spacer block 48 rather than in the cylindrical block 47. The mode of operation is substantially identical to that hereinbefore described with the exception that the contact with the leads 28 is made with the lower extremities of the leads. When additional assurance is required that contact is always made to the leads 28 of the package carried by the plug 11, an additional set of blade-like contact elements 61 is provided. Thus, as shown in FIGURE 11, contact elements are provided both in the cylindrical block 47 and in the spacer block 48. This provides the additional assurance that electrical contact will be made with each of the leads 28 of the TO–5 package as soon as the plug is inserted into the holder or contactor.

It can be seen that the embodiments of the holder or contactor shown in FIGURES 8–11 are of the heavy duty type and that a contactor of this type is particularly adapted for use in which large quantities of the packages are to be tested. The use of the plug for carrying the TO–5 package throughout the test operations is particularly advantageous in that once the TO–5 package has been placed on the plug, the leads will always be retained in perfect alignment without bending or marring the same so that contact can be readily made with each of the leads in the holder or contactor. As also pointed out previously, the plug is particularly advantageous in that it provides means whereby the TO–5 package can be readily handled and utilized with automatic handling machinery. In addition, the plug is made in such a manner so that it is relatively inexpensive so that when desired it can be shipped with the package to provide protection and support for the leads of the package so that the package will arrive at the customer in excellent condition.

I claim:

1. In a plug of the type particularly adapted for use with a TO–5 package having a plurality of leads depending therefrom and defining a circle, a cylindrical body formed of insulating material having an outer side surface and end surfaces, said body being formed with a plurality of slots in the body and opening through the side surface and the end surfaces, said slots extending radially of the body and longitudinally of the body, said body being formed with a key, one of said slots being formed in said key.

2. In an assembly of a holder and a plug for use with an electronic package, the plug comprising a body of insulating material, the body having a plurality of slots formed therein and spaced equally about the outer surface of the body, said slots being adapted to receive the leads of the electronic package, said holder comprising a mounting member and contact elements carried by the mounting member, said mounting member having a hole therein, said contact elements being slidably mounted in said mounting member, said contact elements having openings therein and a resilient O-ring disposed in the openings and extending about the outer periphery of the mounting member and serving to yieldably urge the contact elements into a position in said hole, said plug being mounted in said holder so that the contact elements are adapted to engage the leads of a package carried by the plug.

3. In an assembly of the character described, an electronic device having a plurality of leads extending generally in one direction therefrom, and a plug formed of insulating material and having an outer side surface and end surfaces, said plug having a plurality of longitudinally extending slots formed in the outer peripheral portions thereof and opening through the outer side surface and the end surfaces, said leads being disposed in said slots, said slots in said plug being of a length greater than the length of the leads and having a depth substantially greater than the width of the leads so that the leads are disposed completely within said slots and are protected from damage, said plug being formed with outwardly facing cut-outs on each end.

4. In an assembly of the character described, an electronic package having a plurality of leads extending therefrom generally in one direction, a plug formed of insulating material, the plug having a plurality of slots formed in the outer peripheral portions thereof extending longitudinally of the plug and opening outwardly through the outer surface of the plug, said leads being disposed in said slots, said slots having a length which is greater than the length of the leads and having a depth which is greater than the width of the leads so that the leads are protected by the plug, and a holder comprising a mounting member, contact elements slidably mounted in the mounting member, said mounting member having a hole therein, said plug being disposed in the hole in said mounting member, said contact elements being of such a width that they are capable of extending into said slots in said plug, said contact elements having openings therein, and a resilient member mounted in the openings and extending about the outer periphery of the mounting member to urge the contact elements into said slots and into engagement with the leads disposed in said slots to make electrical contact therewith.

5. In an assembly of a holder and a plug for use with an electronic package of the type having leads extending therefrom, the plug comprising a body of insulating material, the body having a plurality of equally spaced slots formed therein opening through the outer surface of the body, said slots being adapted to receive the leads of the electronic package, the holder comprising a mounting member and contact elements slidably carried by the mounting member, said mounting member having a hole therein, said contact elements having openings therein, said plug being disposed in the hole in said mounting member and a resilient O-ring disposed in the openings in the contact elements and extending about the outer periphery of the mounting member and urging the contact elements into engagement with the leads in the slots.

6. In an assembly of the character described an electronic device having a body and a plurality of leads extending generally in one direction from the body, the length of the leads being substantially greater than the length of the body, a cylindrical plug formed solely of insulating material and having an outer cylindrical side surface and planar end surfaces, said plug having a plurality of straight continuous longitudinally extending slots formed in the outer peripheral portions thereof extending from one end to the other and opening through the outer side surface and the end surfaces, said electronic device being mounted on said plug with the body in relatively close proximity to one end surface of the plug so that substantially the entire length of the leads are disposed in said slots, said slots in said plug being of a length greater than the length of the leads and having a depth which is substantially greater than the width of the leads so that the leads are disposed completely within said slots and are protected from damage, said plug being usable as a single entity for carrying said electronic device and serving as the sole means for carrying the electronic device, said leads being in positive, frictional engagement with the walls defining the slots so that the electronic device is retained on the plug solely by frictional engagement of the leads with the plug said leads being exposed in said slots so that direct contact can be made with the leads while they are in said slots.

References Cited

UNITED STATES PATENTS

| | | | |
|---|---|---|---|
| 2,113,328 | 4/1938 | Makenny | 339—258 X |
| 2,595,267 | 1/1950 | Larson | 339—61 |
| 2,696,535 | 12/1954 | McLean et al. | 339—150 X |
| 2,738,483 | 3/1956 | McLean et al. | 339—156 X |
| 2,814,790 | 11/1957 | Stoll et al. | 339—151 X |
| 2,881,405 | 4/1959 | Yarbrough | 339—126 X |
| 3,184,532 | 5/1965 | Spera | 339—17 X |
| 3,184,536 | 5/1965 | Vincent | 339—17 X |
| 3,263,200 | 7/1966 | Kocmich | 339—126 X |

FOREIGN PATENTS 903,852   8/1962   Great Britain.

MARVIN A. CHAMPION, *Primary Examiner.*

EDWARD C. ALLEN, W. DONALD MILLER, *Examiners.*

J. R. MOSES, *Assistant Examiner.*